US007023942B1

United States Patent

(12) United States Patent
Roberts et al.

(10) Patent No.: US 7,023,942 B1
(45) Date of Patent: Apr. 4, 2006

(54) METHOD AND APPARATUS FOR DIGITAL DATA SYNCHRONIZATION

(75) Inventors: Kim B. Roberts, Ottawa (CA); Ronald J. Gagnon, Ottawa (CA); James A. Shields, Ottawa (CA)

(73) Assignee: Nortel Networks Limited, St. Laurent ( * ) Notice: Subject to any disclaimer, the term of this patent is extended or adjusted under 35 U.S.C. 154(b) by 510 days.

(21) Appl. No.: 09/972,686

(22) Filed: Oct. 9, 2001

(51) Int. Cl.
*H04L 7/00* (2006.01)

(52) U.S. Cl. ........................ 375/356; 375/372; 370/506

(58) Field of Classification Search ................ 375/354, 375/356, 363, 371, 372, 375, 376; 370/503, 370/505, 506, 516
See application file for complete search history.

(56) References Cited

U.S. PATENT DOCUMENTS

| | | | | |
|---|---|---|---|---|
| 5,497,405 | A * | 3/1996 | Elliott et al. | 375/372 |
| 6,415,006 | B1 * | 7/2002 | Rude | 375/372 |
| 6,535,567 | B1 * | 3/2003 | Girardeau, Jr. | 375/372 |
| 6,674,771 | B1 * | 1/2004 | Taniguchi | 370/505 |
| 6,819,725 | B1 * | 11/2004 | Oliver et al. | 375/371 |

FOREIGN PATENT DOCUMENTS

| | | |
|---|---|---|
| EP | 0248551 | 9/1987 |
| EP | 1067722 | 10/2001 |
| WO | WO 96 39762 A | 12/1996 |

OTHER PUBLICATIONS

Lau R C et al: "Synchronous Techniques for Timing Recovery in Bisdn" IEEE Transactions on Communications, IEEE Inc. New York, US, vol. 43, No. 2/4, Part 3, Feb. 1, 1995, pp. 1810-1818, XPOOO5O5653 ISSN: OO9O-6778, p. 1, right-hand col. line 35-line 44, p. 2, right-hand col. line 21-line 29, p. 2, right-hand col. line 42, p. 3, left-hand col. line 10, p. 3 right-hand col. line 3-line 25, p. 4, left-hand col. 26-line 31, p. 4, right-hand col. line 3-line 11, figs. 3, 5-7.

(Continued)

*Primary Examiner*—Dac V. Ha
(74) *Attorney, Agent, or Firm*—Matthew M. Roy; Ogilvy Renault, LLP

(57) ABSTRACT

Synchronization and desynchronization of a data signal transported in a synchronous frame across a synchronous communications network, such as SONET/SDH, reduces waiting-time jitter. A timing estimate (F) indicative of a relationship between a data rate (f1) of the data signal and a reference frequency (f2) of the synchronous communications network is calculated and communicated through the synchronous communications network, for example in the Synchronous Payload Envelope of a SONET frame. The data signal is recovered using a desynchronizer Phase-Locked Loop steered by the timing estimate (F). The timing estimate (F) can be any one or more of: a ratio between the data rate (f1) and the reference frequency (f2); a difference between the data rate (f1) and the reference frequency (f2); and a phase difference between a recovered data clock signal associated with the data rate (f1) and a reference clock signal associated with the reference frequency (f2).

27 Claims, 9 Drawing Sheets

OTHER PUBLICATIONS

Duttweiler D L: "Waiting Time Jitter" Bell System Technical Journal, American Telephone and Telegraph Co. New York, US, vol. 51, No. 1, Jan. 1972, pp. 165-207, XPOOO798920 cited in the application p. 1-6.
Mulvey M et al: "Timing Issues of Constant Bit Rate Services Over ATM" BT Technology Journal, BT Laboratories, GB, vol. 13, No. 3, Jul. 1, 1995, pp. 35-45, XPOOO543496 ISSN: 1358-3948 paragraphs 03.0!-03.2!.
Nawrocki R et al: "Waiting Time Jitter Reduction by Fill Locking" Electronics Letters, IEE Stevenage, GB, vol. 26, No. 16, Aug. 2, 1990 pp. 1227-1228, XPOOO1O8212, ISSN: 0013-5194, the whole document.

* cited by examiner

METHOD AND APPARATUS FOR DIGITAL DATA SYNCHRONIZATION

FIELD OF THE INVENTION

The present invention relates to communications networks, and in particular to methods of synchronization or desynchronization of a data signal transported across a SONET or SDH network.

BACKGROUND OF THE INVENTION

Within the modern network space, the Synochronous Optical Network (SONET)/Synchronous Digital Hierarchy (SDH) protocol is becoming increasingly popular as a mechanism for data transport. In this respect, SDH is the European equivalent of the SONET transmission standard. Accordingly, all references in this application to SONET should be understood to also refer to SDH.

A significant amount of SONET/SDH infrastructure has been installed, particularly within the network core. This SONET infrastructure is used to transport asynchronous subscriber signal traffic having differing formats, such as Asynchronous Transfer Mode (ATM), Internet Protocol (IP), etc. In order to facilitate this functionality, various known methods are provided for mapping the asynchronous subscriber traffic into Synchronous Transfer Signal (STS/STM) frames for transport across the SONET infrastructure, and then extracting the subscriber traffic out of the STS to recover the original subscriber signal format.

FIG. 1*a* is a block diagram schematically illustrating principal operations of a conventional transmitting node 2 of an optical communications system. As shown in FIG. 1*a*, asynchronous subscriber traffic within multiple tributaries 4 is received by the node 2 and buffered in an elastic store 6. The traffic may comprise any arbitrary mix of signals, including DS-1, DS-3 and E1 traffic. Traffic within each tributary 4 is normally buffered in a respective First-In-First-Out (FIFO) buffer 8. The timing of this buffering operation is controlled by a data clock signal 10 having a frequency f1 generated by a tributary clock recovery circuit 12. A synchronizing framer (or "mapping unit") 14 reads data from each FIFO 8, and maps the read data into corresponding tributaries of a number of SONET Synchronous Payload Envelopes (SPEs) 16, using a known format such as those defined in the SONET standard. Each SPE 16 is then passed to a channel transmitter (Tx) 18, which inserts the SPEs into an STS frame, and then modulates the STS frame onto an optical channel carrier 20 for transmission through the optical network. A Tx local clock 22, which is synchronous with a SONET Primary Reference 24, generates a respective TX local clock signal 26 having a frequency f2, which is used to control operation of the synchronizing framer 14 and channel Tx 18.

As is known in the art, the number and size of the SPEs 16 are selected based on the channel line rate. For example, for a channel line rate of 10 Gb/s, the synchronizing framer 14 may map subscriber traffic into a set of four STS-48 envelopes. Other combinations may equally be used, such as, for example, eight STS-12 envelopes.

Normally, a respective buffer fill signal 28 is generated for each tributary FIFO 8, and used to control the insertion of stuffing bits into the corresponding SPE tributary.

As shown in FIG. 1*b*, at the terminating node 30, the incoming STS 20 is decoded by a channel receiver (Rx) 32 and processed by a pointer processor 34 to demap each SPE tributary from the STS 20. Thus, stuffing bits are stripped out of each tributary, and the remaining subscriber data stored in a respective tributary FIFO 36 of an elastic store 38. An Rx local clock signal 40, having a frequency f3 which is preferably referenced to the SONET Primary Reference 24, is supplied to a desynchronizer Phase locked Loop (PLL) 42. A buffer fill signal 44 generated by the tributary FIFO 36 is used to steer the Phase locked Loop (PLL) 42, so that the PLL output constitutes a recovered data clock signal 46 having a frequency f4 which approximates the data rate of the subscriber traffic. As a result, by reading data from the tributary FIFO 36 at a timing of the recovered data clock 46, a desynchronizer framer 48 can generate a recovered subscriber signal 50 in which the original timing is closely approximated.

For cases in which the channel line rate is equal to or greater than the subscriber data rate (i.e. for f1≦f2), the introduction of idle packets to replace "missing" subscriber traffic enables the synchronizing and desynchronizing framers 14 and 48 to compensate any differences between the tributary data rate and the channel rate. However, this mapping technique suffers a limitation in that the fill signal 44 of the Rx tributary FIFO buffer 3*b* tends to vary in a step-wise manner as idle packets are inserted and striped from SPE tributaries. This causes timing jitter in the recovered subscriber signal 50.

In most situations, the amount of timing jitter introduced by mapping and demapping asynchronous client signal traffic to and from STS frames does not create any difficulties. However, if the timing of the subscriber signal is critical, such as an HDTV signal or a subscriber-originated SONET signal (e.g. for SONET over SONET applications) the introduced timing jitter can noticeably degrade the quality of the subscriber's signal. Accordingly, there is interest in methods that enable subscriber traffic to be transparently mapped on to SONET STS signals. An important aspect for transparency is to preserve the original timing information of the subscriber signal. Accordingly, it would be highly desirable to provide improved methods of synchronization and desynchronization that redress the deficiencies of the prior art as described above.

SUMMARY OF THE INVENTION

It is therefore an object of the present invention to provide methods of synchronization and desynchronization that overcome at least one of the deficiencies of the prior art.

The present invention therefore provides a method of rate adapting an asynchronous subscriber signal on to SONET STS frames without incurring waiting time jitter, by measuring the phase and frequency of the (asynchronous) subscriber signal and encoding this information into the frame overhead. Thus, a multi-bit digital timing estimate (F) is calculated to indicate the difference between the tributary data rate f1, and the Tx local clock frequency f2. In one embodiment, the timing estimate F is computed as a ratio between f1 and f2. In other embodiments, the timing estimate F may be computed as a phase difference between the subscriber data signal and Tx local clock signal, calculated at the time that a corresponding client data block is mapped into the SPE. In either case, the timing estimate F is supplied to the synchronizing framer (or "mapping unit") and used in place of the tributary fill to control the insertion of stuff bytes into the SPE tributary. The timing estimate F is also inserted into the SPE tributary and conveyed with the subscriber data to the terminating node.

At the terminating node, the pointer processor demaps each SPE tributary, and extracts the timing estimate F. The timing estimate F extracted from the SPE tributary is used in place of the elastic store fill signal to steer the desynchronizer Phase locked Loop (PLL). Consequently, the PLL output constitutes a recovered data clock signal having a frequency f4 which more closely approximates the original frequency f1 of the subscriber traffic. As a result, by reading subscriber data from the tributary FIFO at a timing of the recovered data clock, the desynchronizer framer can generate a recovered subscriber signal in which the original timing is substantially restored.

An important attribute of the present invention is that the timing estimate F enables the transparent transport of the subscriber's original phase variations over a reasonable bandwidth (e.g. 100 Hz–1 KHz). Traditionally, waiting time jitter is reduced by narrowing the bandwidth of the desynchronizer PLL. However, very narrow filtering at the desynchronizer PLL has the effect of attenuating the subscriber signal's phase variations and hence looses some transparency of the subscriber timing characteristics. The present invention overcomes this limitation by the accurate measurement of subscriber phase/frequency at the synchronizer. This information is encoded within the STS frame (in the form of timing estimate F) and used to steer the desynchonizer PLL, which substantially eliminates waiting time jitter.

Another important attribute of the present invention is that, unlike conventional systems, an elastic store fill signals and are not used to control insertion of stuff bytes at either the transmitting or receiving nodes. This avoids problems due to the fill signals containing clock noise, cross-talk from other signals, and data patterning. Instead of the elastic store fill signals, the present invention uses the timing estimate F as an accurate measurement of the subscriber phase/frequency to drive stuffing at the transmitting node and generation of the recovered data clock signal at the receiving node.

Therefore, in accordance with one aspect of the present invention, a method of synchronizing a data signal for transport across a synchronous communications network includes steps of calculating a timing estimate (F) indicative of a relationship between a data rate (f1) of the data signal and a reference frequency (f2) of the synchronous communications network; mapping data of the data signal to a synchronous signal of the synchronous communications network in accordance with the reference frequency (f2), while inserting stuff bits into the synchronous signal in accordance with the timing estimate (F); and communicating the timing estimate (F) through the synchronous network.

In accordance with another aspect of the present invention, a method of desynchronizing a data signal transported across a synchronous communications network includes steps of receiving a synchronous payload envelope (SPE) of the synchronous communications network, the SPE containing data of the data signal and a timing estimate (F) indicative of a relationship between a data rate (f1) of the data signal and a reference frequency (f2) of the synchronous communications network; and demapping the data of the data signal from the SPE in accordance with the reference frequency (f2); while extracting stuff bits from the synchronous signal in accordance with the timing estimate (F).

In accordance with yet another aspect of the present invention, a synchronizer for synchronizing a data signal for transport across a synchronous communications network includes a control loop unit for calculating a timing estimate (F) indicative of a relationship between a data rate (f1) of the data signal and a reference frequency (f2) of the synchronous communications network; and a mapping unit for mapping the data signal into a synchronous frame in accordance with the reference frequency (f2), the mapping unit inserting stuff bits into the synchronous frame in accordance with the timing estimate (F), the mapping unit also inserting the timing estimate (F) into the synchronous frame for transport across the synchronous communications network.

In accordance with a further aspect of the present invention, a desynchronizer is provided for desynchronizing a data signal transported across a synchronous communications network within a synchronous payload envelope (SPE) of the synchronous communications network, the SPE containing data of the data signal and a timing estimate (F) indicative of a relationship between a data rate (f1) of the data signal and a reference frequency (f2) of the synchronous communications network. The desynchronizer includes a pointer processor for demapping the data of the data signal from the SPE in accordance with the reference frequency (f2); while extracting stuff bits from the synchronous signal in accordance with the timing estimate (F).

BRIEF DESCRIPTION OF THE DRAWINGS

Other aspects and features of the present invention will become apparent to those ordinarily skilled in the art upon review of the following description of specific embodiments of the invention in conjunction with the accompanying figures, in which.

Like numerals denote like features in the drawings to facilitate an understanding the invention.

DETAILED DESCRIPTION OF THE PREFERRED EMBODIMENTS

Figure 2A:
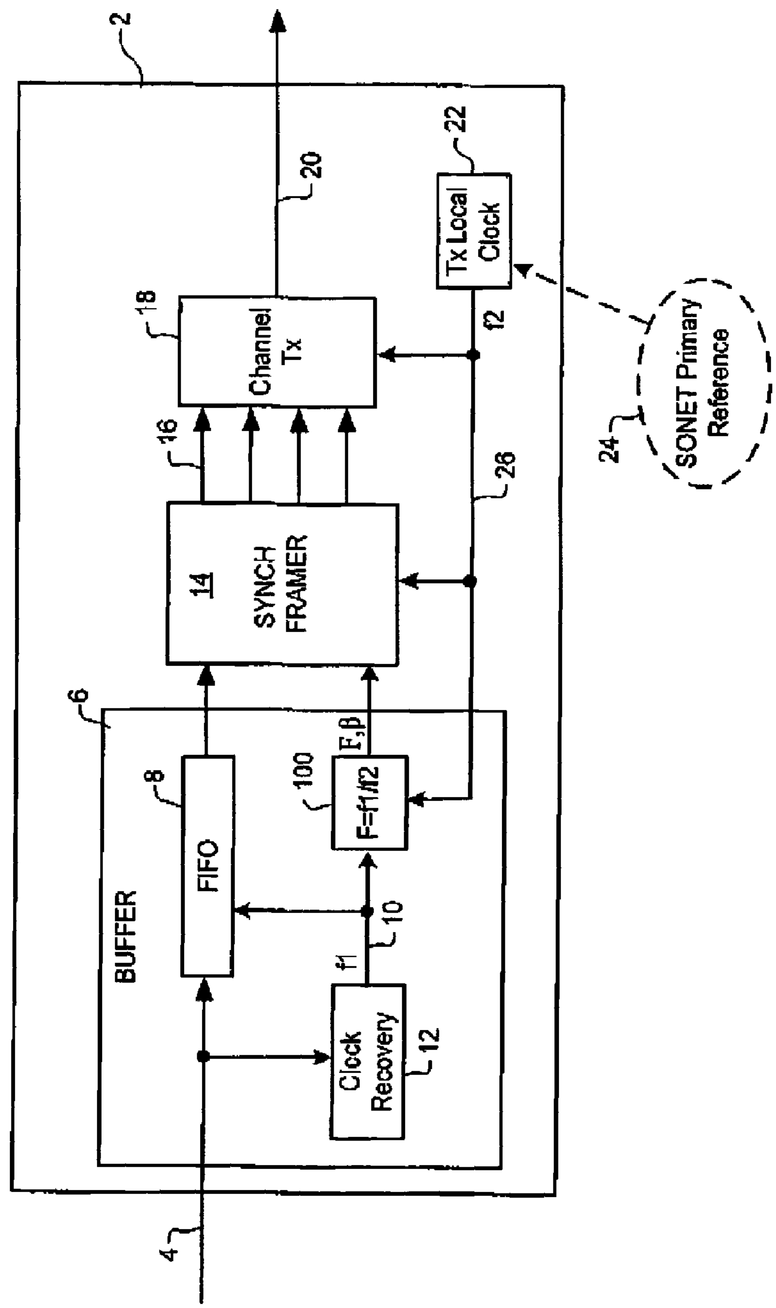
FIGS. 2A and 2B are block diagrams schematically illustrating originating and terminating nodes, respectively, in accordance with embodiments of the present invention.
Figure 2B:
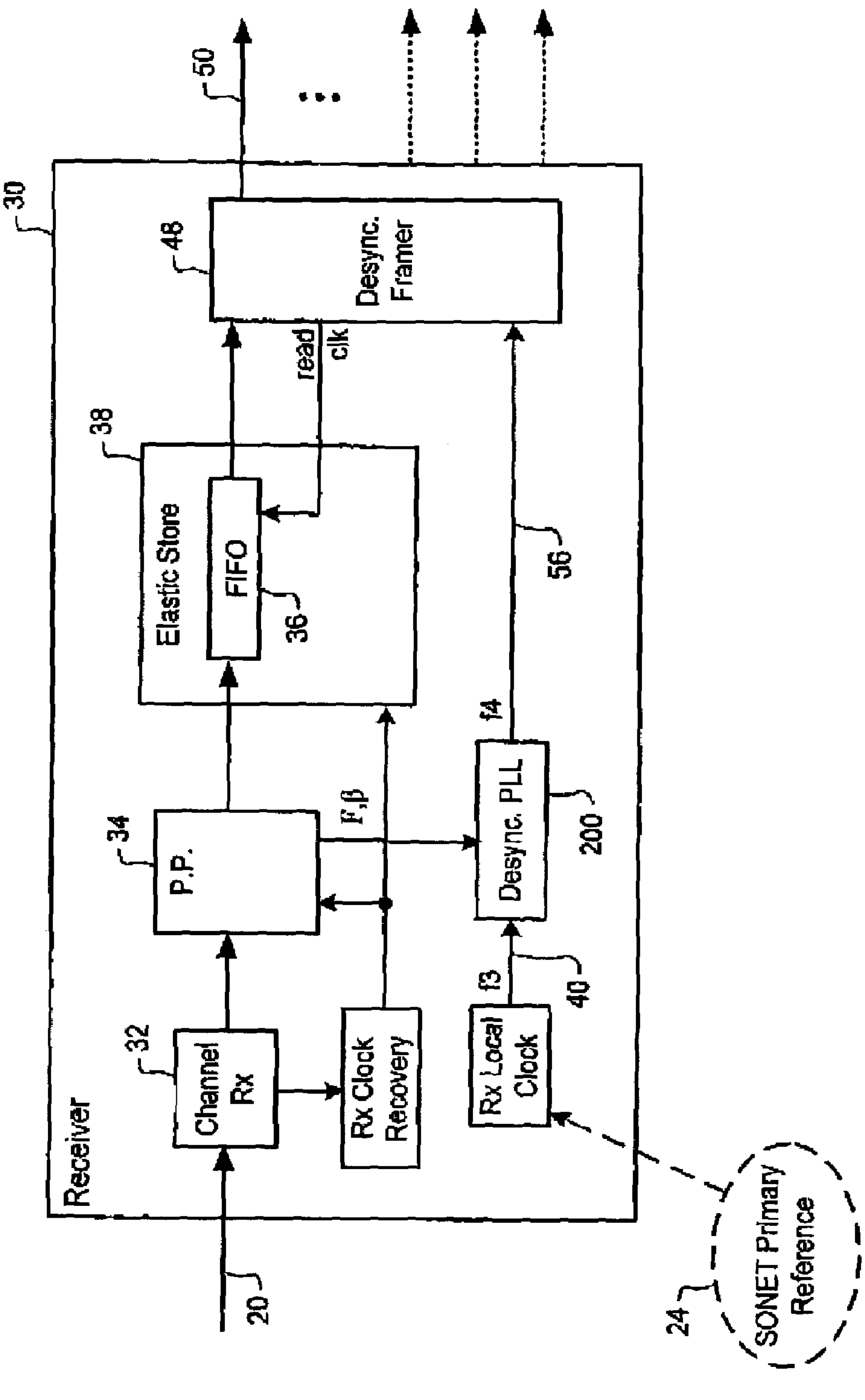

FIG. 2A schematically illustrates a synchronizer and method of synchronization at an originating node whereas FIG. 2B illustrates the corresponding desynchronizer and method of desynchronization at a receiving node in a SONET or SDH network.

In general, the present invention teaches methods of rate adapting an asynchronous subscriber signal on to SONET STS frames without incurring waiting time jitter, by measuring the phase and frequency of the (asynchronous) subscriber signal and encoding this information into the frame overhead. Thus, as shown in FIG. 2A, a multi-bit digital timing estimate (F) is calculated (at 100) to indicate the difference between the tributary data rate f1, and the Tx local clock frequency f2. In the embodiment of FIG. 2A, the timing estimate F is computed as a ratio between f1 and f2. In other embodiments, the timing estimate F may be computed as a phase difference between the subscriber data signal and Tx local clock signal, calculated at the time that a corresponding client data block is mapped into the SPE. In either case, the timing estimate F is supplied to the synchronizing framer 14 and used in place of the tributary fill 28 to control the insertion of stuff bytes into the SPE tributary. The timing estimate F is also inserted into the SPE tributary and conveyed with the subscriber data to the terminating node 30.

As shown in FIG. 2B, at the terminating node 30, the pointer processor 34 demaps each SPE tributary, and extracts the timing estimate F. The timing estimate F extracted from the SPE tributary is used in place of the elastic store fill signal 44 to steer the desynchronizer Phase locked Loop (PLL) 200. Consequently, the PLL output constitutes a recovered data clock signal 56 having a frequency f4 which more closely approximates the original frequency f1 of the subscriber traffic. As a result, by reading subscriber data from the tributary FIFO 36 at a timing of the recovered data clock 56, the desynchronizer framer 48 can generate a recovered subscriber signal 50 in which the original timing is substantially restored.

Figure 1A:
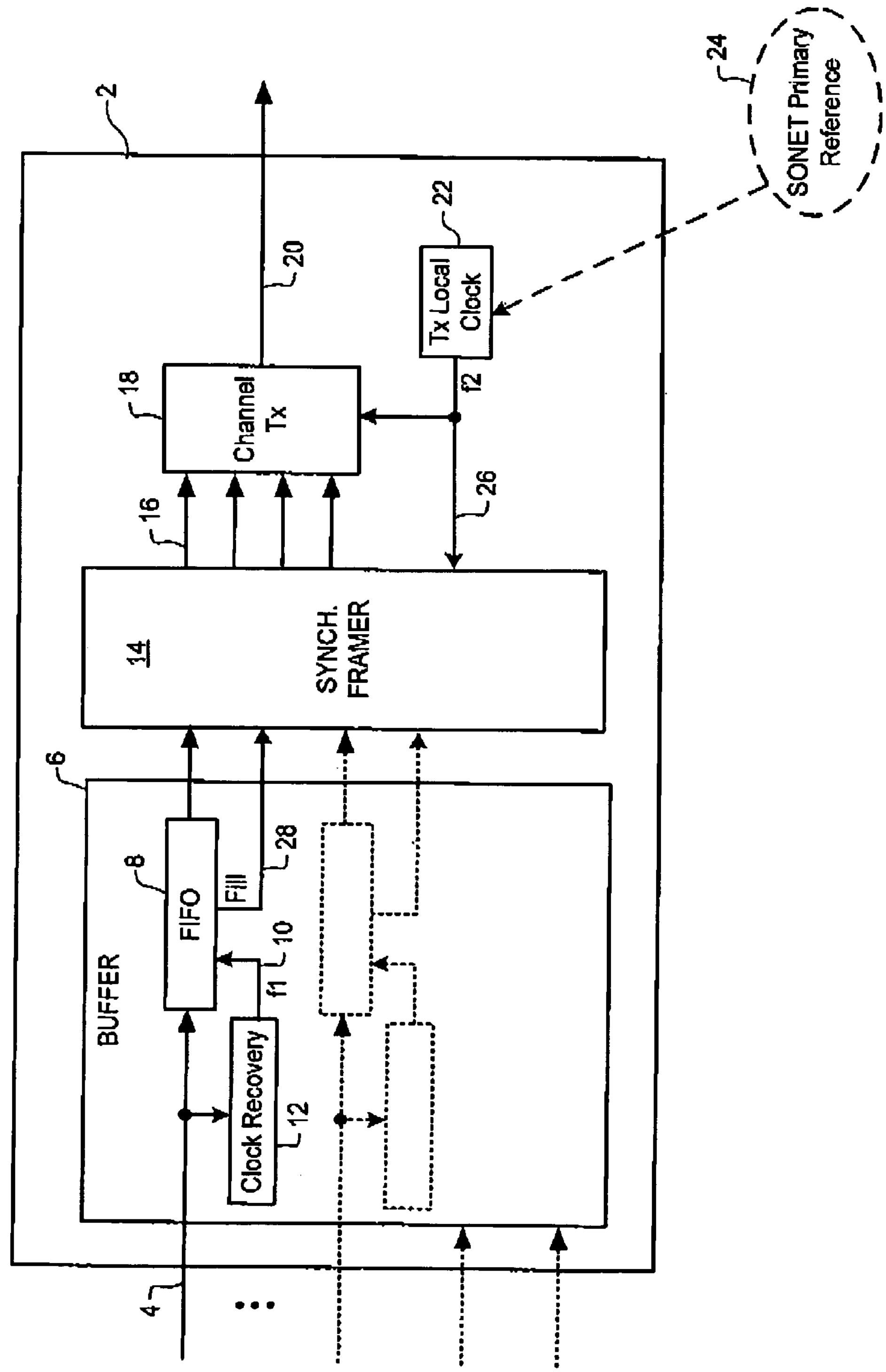
FIGS. 1A and 1B are block diagrams schematically illustrating conventional originating and terminating nodes, respectively, of an optical communications network.
Figure 1B:
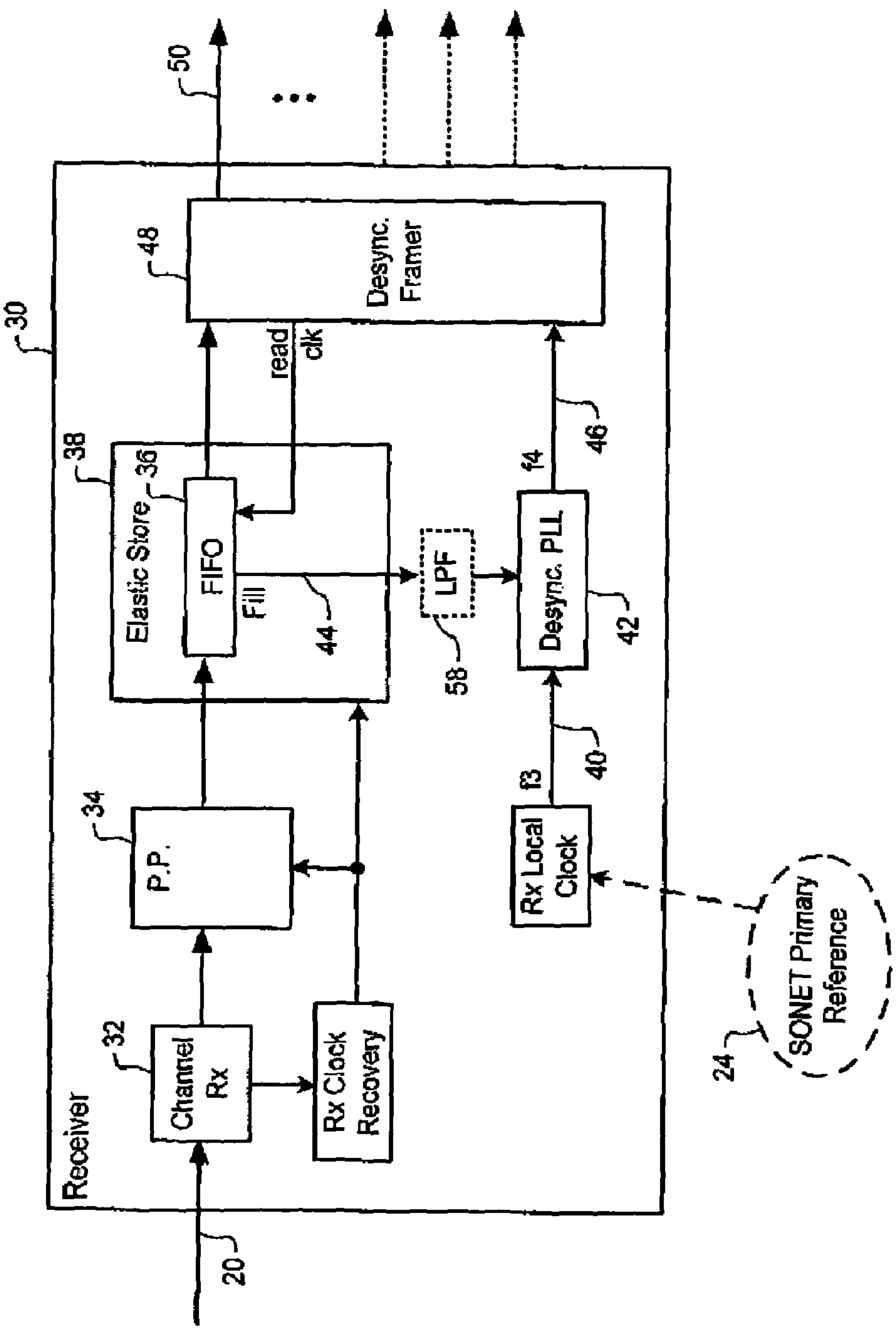

An important attribute of the present invention is that the timing estimate F enables the transparent transport of the subscriber's original phase variations over a reasonable bandwidth (e.g. 100 Hz–1 KHz). Traditionally, waiting time jitter is reduced by narrowing the bandwidth of the desynchronizer PLL 42 (see FIG. 1B). However, very narrow filtering at the desynchronizer PLL 42 has the effect of attenuating the subscriber signal's phase variations and hence looses some transparency of the subscriber timing characteristics. The present invention overcomes this limitation by the accurate measurement of subscriber phase/frequency at the synchronizer 2. This information is encoded within the STS frame (in the form of timing estimate F) and used to steer the desynchronizer PLL 200, which substantially eliminates waiting time jitter.

Another important attribute of the present invention is that, unlike conventional systems, an elastic store fill signals 28 and 44 are not used to control insertion of stuff bytes at either the transmitting or receiving nodes 2, 30. This avoids problems due to the fill signals 22 and 44 containing clock noise, cross-talk from other signals, and data patterning. Instead of the elastic store fill signals 22 and 44, the present invention uses the timing estimate F as an accurate measurement of the subscriber phase/frequency to drive stuffing at the transmitting node 2 and generation of the recovered data clock signal 56 at the receiving node 30.

It should be apparent to those of ordinary skill in the art that most of the components at the originating node, including the FIFO buffer, clock recovery circuit, framer, and channel Tx, are well known in the art, and thus need not be further described. Likewise, most of the components at the receiving node, including the channel Rx, Rx clock recovery, pointer processor, FIFO elastic store, PLL and desynchronization framer are also well known in the art and thus need not be further described.

As shown in FIG. 2A, a control loop unit 100 generates a β value that is included per block and is used by the mapping unit (also known as the "synchronization framer") 14 in justifying and mapping the asynchronous data signals into appropriate SONET frames. The control loop unit 100 further generates a frequency value F that represents the relationship between the bit rate $f_1$ of the asynchronous data signals and the bit rate of a SONET signal $f_2$, expressed as fraction of a multibit word for high resolution.

More particularly in this embodiment, the control loop unit is analogous to a Phase locked loop (PLL), as later described, and is referred to as a digital PLL 100. The Digital PLL 100 calculates F which represents the frequency of the asynchronous signals of rate $f_1$ in a specified sampling interval, in this case, phase sampling interval, which is a specified multiple of the SONET clock rate $f_2$, and is a fraction representing the data clock rate $f_1$ over the SONET clock $f_2$ rate, expressed as a multibit word. In other words, it calculates F as the block relative frequency, which is a non-integer value F, which represents the exact frequency (to an arbitrary accuracy) of the data signals in units of words per block relative to the ungapped SONET clock 24 at the synchronizer. F is a higher resolution indicator of fractional frequency information than a traditional stuff indicator inside a circuit.

The value β is an integer output truncated from the value (F+the last residual fraction). The fractional part of the above becomes the next residual fraction.

Values for F and β are transmitted with each block of words. Because the synchronizer and desynchronizer are synchronous, being ports of network elements in a synchronous network, the data clock bit rate $f_1$ can then be recovered at the far end at the desynchronizer based on the F values transmitted with each block, as further detailed below. Traditionally, this frequency was reconstructed at the desynchronizer.

Figure 3:
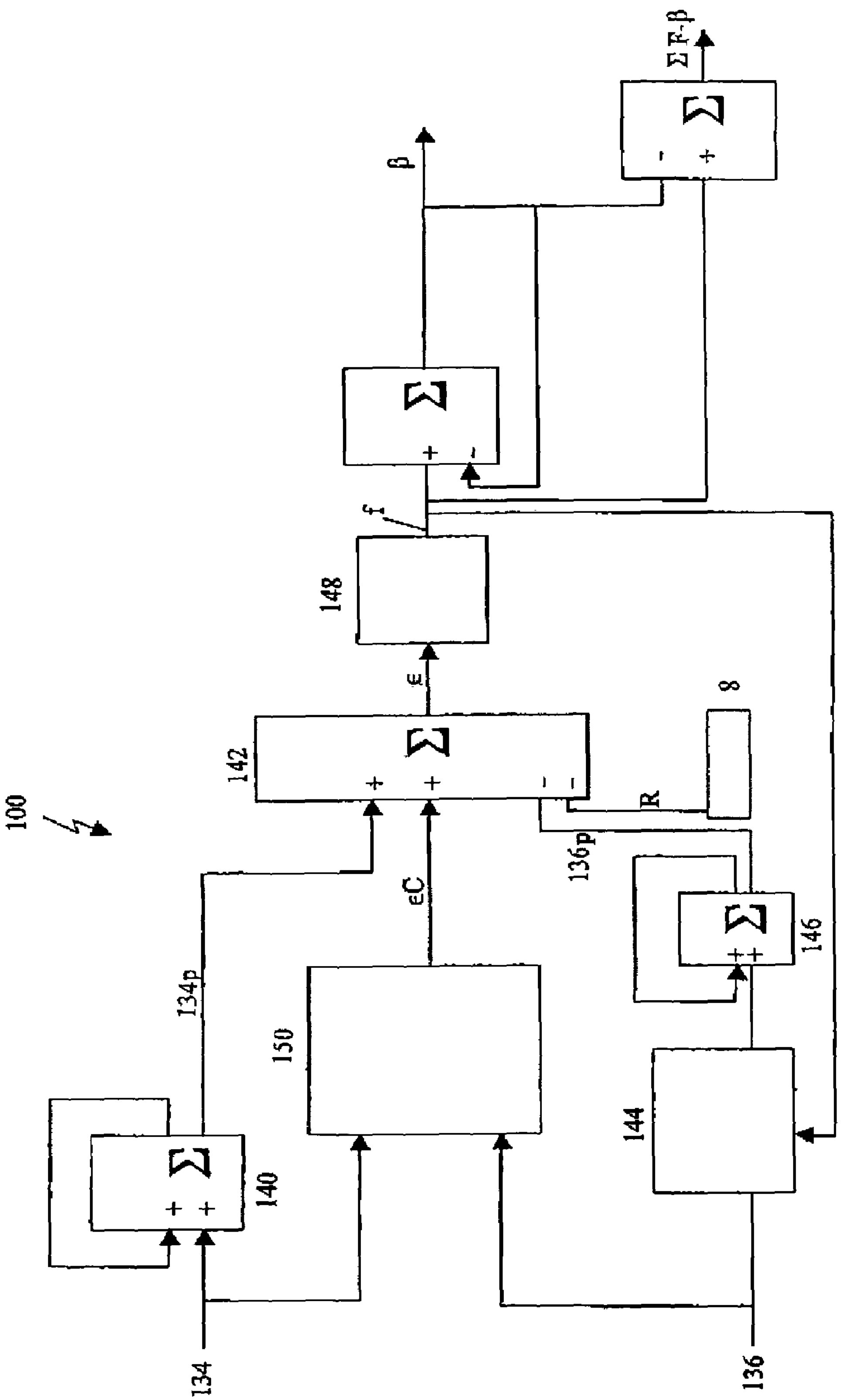
FIG. 3 depicts a digital synchronizer PLL.

Referring to FIG. 3, the digital PLL 100 is described in greater detail. The 16-bit data multibit clock 134 from the framer and gapper unit 14 is inputted into a frequency-to-phase converter such as into a digital summer subcircuit 140, which continuously adds together the multibit values received to a 32-bit accuracy. The sum is periodically sampled. For example, the digital summer 140 may sum multibit values and sampled every 10 or 100 cycles, as selected. The summed output yields phase information. The output is inputted into a phase comparator 142, such as a digital subtractor.

The SONET multibit clock 136 is generated in the mapper unit (i.e. the synchronization framer) 14 and is formed using the F value from previously transmitted blocks to gap the SONET clock 24 (with its associated local clock 22). As set out above, transport overhead, path overhead and block overhead have already been gapped. Preferably, all overhead not available for data is gapped.

The SONET multibit clock value is further reduced by the amount of the average number of gaps transmitted (ie. gaps in relation to available data words not being used for incoming data (ie stuff bytes) are removed) in an f-gapping subcircuit 144. The f-gapping unit 144 is analogous to a voltage controlled oscillator in that the f value is a frequency that is imposed through the gapping function, which is analogous to voltage controlling the frequency of a VCO. Having regard to the proportion of data bits unavailable due to overhead in a given clock cycle, the remaining available data bits is reduced by the proportion of bytes used for data. The resulting proportion is to be applied to the corresponding SONET multibit values.

For example, in a given block 10% of the bytes in a block are unavailable for data or stuffing being overhead. As such, 90% of the bytes remain available. Of this 90%, half of the bytes are used for data. Therefore 90%×50%=45% of the block is non-data and accordingly stuffed with stuff bytes. The 45% proportion is applied to the corresponding multibit value to generate a multibit, value reflecting the f-gapping and overhead gapping, for example 45%×65536=29491.2 The fractional part of f will not accumulate because of the synchronizer PLL action that compensates for any errors due to the fractional part of f. Therefore it is not necessary to pass the 0.2 through the feedback loop.

The multibit values from the SONET multibit clock 136 as reduced by the proportion computed following the f-gapping unit 144 are continuously summed in a frequency to phase converter 146 such as a digital summer and integrated to yield phase information.

The digital subtractor receives the inputted phase information from the data multibit clock 134*p* and from the SONET multibit clock 136*p* and relates the phases. The SONET multibit phase values are subtracted from the data multibit values, the value of the difference being an error signal $\epsilon$. In determining the difference in phase (ie. phase imbalance) between the data multibit clock 134*p* and the SONET multibit clock 134, the digital subtractor operates as a phase comparator, where traditionally, the fill of the FIFO operated in that capacity.

A constant offset reference value R from the FIFO 8 is also inputted into the digital subtractor 142 to be subtracted from the data multibit phase values. In this manner, the fill of the buffer can be kept centred.

The output $\epsilon$ of the phase comparator 142 is inputted into a low pass filter (LPF) 148 that maintains and outputs a running average of the error signals. It smoothes out any rapid changes in error signals (changes that occur at a frequency above its cutoff frequency) to enable the control loop to converge to a correct and stable value. Preferably, the LPF 148 is selected to maintain a whole loop bandwidth, for example, of approximately 200 Hz. An output F from the LPF is then returned to the f-gapping unit 144 for use in f-gapping of subsequent SONET multibit values.

The combination of the f-gapping unit 144, the SONET multibit clock frequency to phase converter 146, the phase comparator 142 and the LPF 148 collectively operate as a PLL, respecting the data multibit clock 134.

The value f is added to the block overhead for a block, and is transmitted with the next block. f is transmitted with every block f is added to block overhead (ie. part of the control field) in the mapper unit.

For example, assuming a 16 bit clock and a block size of a maximum of 1024 words, and an f value of 20000, $\beta$ may be calculated as follows:

$$F_n = \frac{f}{2^{16}} * \text{max. no. words/block} - \frac{2000}{65536} * 1024 = 312.5$$

$\beta_n$=integer portion of $(F_n+\rho_{n-1})$ $\rho_n$=fractional portion of $(F_n+\rho_{n-1})$ where n represents the particular time of the particular block.

$\beta$ is added to the block overhead of the next block in the form of an integer. The fractional portion $\rho$ is retained for the next calculation of $\beta$ to, be included in the overhead of the next block.

Preferably, block overhead is Forward Error Correction (FEC) encoded, so as to provide a means to ensure that the block overhead associated with the F and $\beta$ values are transmitted with high reliability when received.

While the values for F and $\beta$ are included in block overhead for each block transported, alternatively, the values may be included in each block in the form of F-$\beta$ and $\beta$. In this manner, a degree of data compression is achieved. Alternatively, $\Sigma$(F-$\beta$) and $\beta$ can be transmitted. This provides a degree of data compression as before and by transmitted $\Sigma$F rather than F, any corrupted value of $\Sigma$F avoids any long term phase error and causes only a phase transient.

Additional high resolution phase correction may be provided so as to ensure the generation of accurate F values outputted from the phase comparator 142.

The data multibit clock 134 and the SONET multiple clock 136 are each timed from their corresponding simple clocks. The corresponding simple clocks have no harmonic relationship to each other and are generally asynchronous.

The instant of time at which a data multibit clock 134 is digitally integrated by the digital summer 140 will not generally correspond to the timing instant for the SONET clock 134. The time difference resulting in imperfect sampling creates waiting time jitter.

Figure 4A:
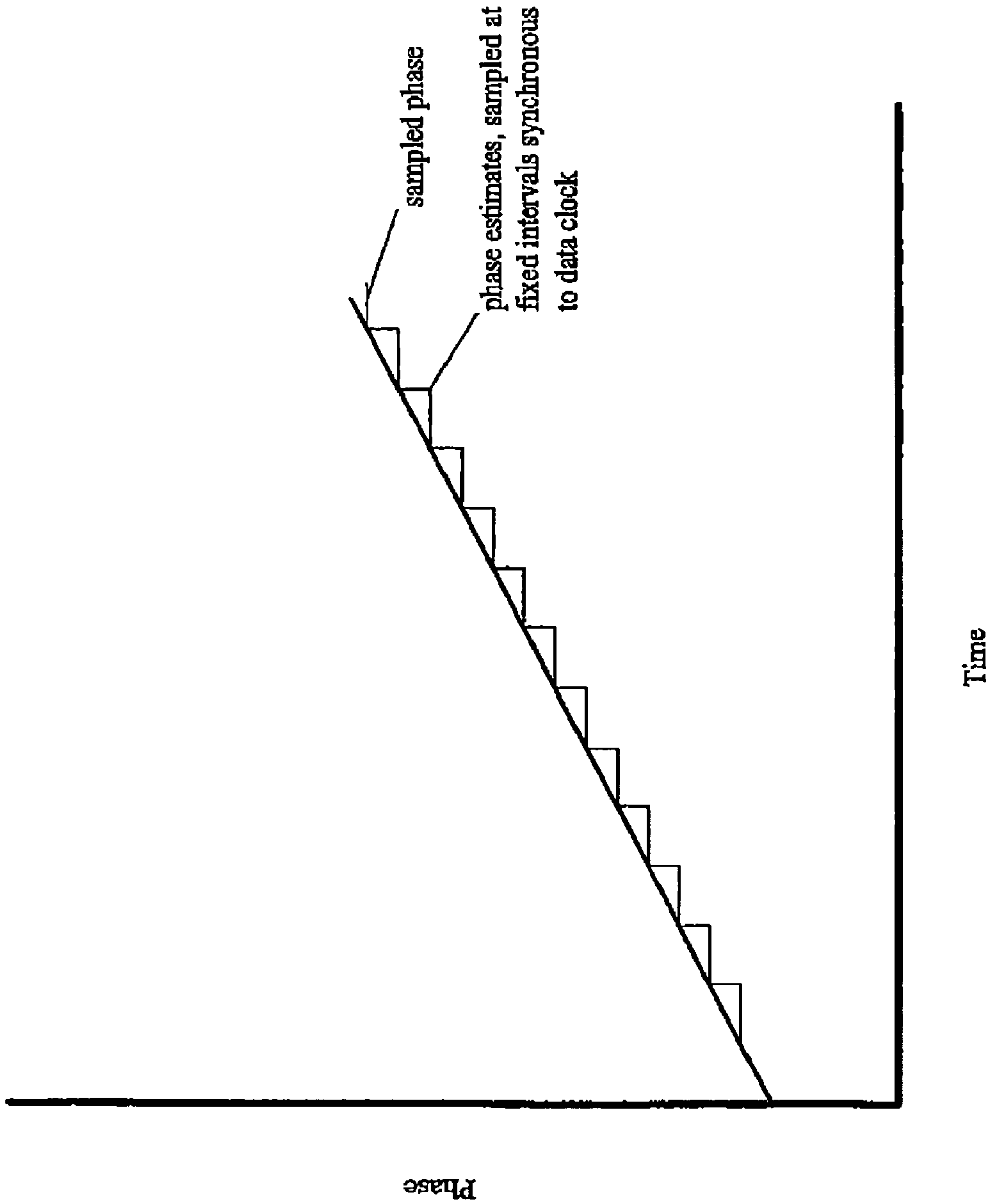
FIG. 4*a* depicts a graph representing the actual phase of a data signal over time, overlaid with phase estimates of the data signal, in accordance with an embodiment of the invention.

More particularly, referring to FIG. 3, the phase of the data multibit clock 134*p* is determined by the integration of the sum of the multibit values received by the digital summer 140. It is a continuous function that is synchronous to the data's local clock. Graphically represented as a function of time, yields a constant linear relationship between real phase and time, as exemplified in FIG. 4*a*. However, as the data phase information is only updated periodically (ie. the integration of the summed data multibit values is performed periodically) in fixed intervals, for example, once every 100 cycles, the estimated phase as a function of time yields a stepped relationship, also as set out in FIG. 4*a*.

Figure 4B:
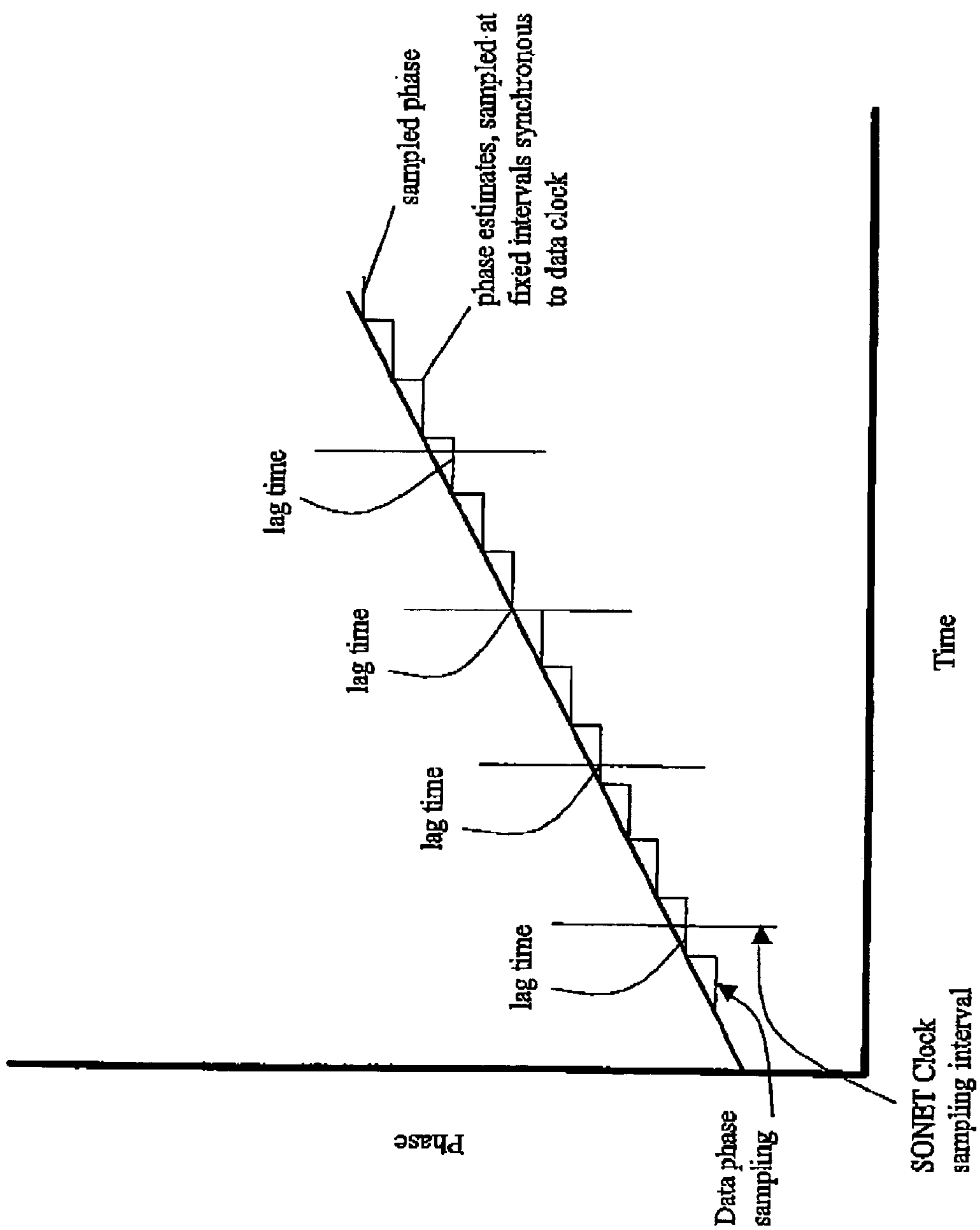
FIG. 4*b* depicts the graph of FIG. 5*a* where phase estimates are taken at fixed clock intervals synchronous to a local clock.

Referring to FIG. 3, phase detection is performed by the digital subtractor 142 using phase information derived from the data multibit values and the SONET multibit values. The SONET multibit clock 136 and the phase comparator 142 operate synchronously to the SONET clock 24, which is generally asynchronous with data clock 12. As a result, phase comparison of the clock phases are conducted asynchronously. As depicted in FIG. 4*b*, there is a varying amount of lag time between the SONET clock sampling interval and the interval in which the data phase information is updated, resulting in an underestimation of the phase of the data multibit clock 134*p*. The lag time difference represents waiting time jitter. Because the lag time varies for different phase samplings at the phase comparator 142, it cannot be averaged or filtered.

The jitter may be corrected by obtaining a real time measurement of the time lapse between the last update of the SONET multibit clock and the time at which phase difference is estimated at the phase comparator/digital subtractor. Referring to FIG. 3, a detailed phase detector 150 uses a real time measurement ($\Delta$T) of the difference in sampling interval between the data multibit clock 134 and the SONET multibit clock 136 and computes from it a phase error correction as described below. The real time measuring function ($\Delta$T) may be performed by an ASIC sub-circuit, capacitor chain, external components, or the like, and receives frequency input from the data multibit clock 134 and from the SONET multibit clock 136 and measures the real time lapsed. The time lapse is measured to an adequate resolution, for example, 0.1 nanosecond resolution.

Figure 4C:
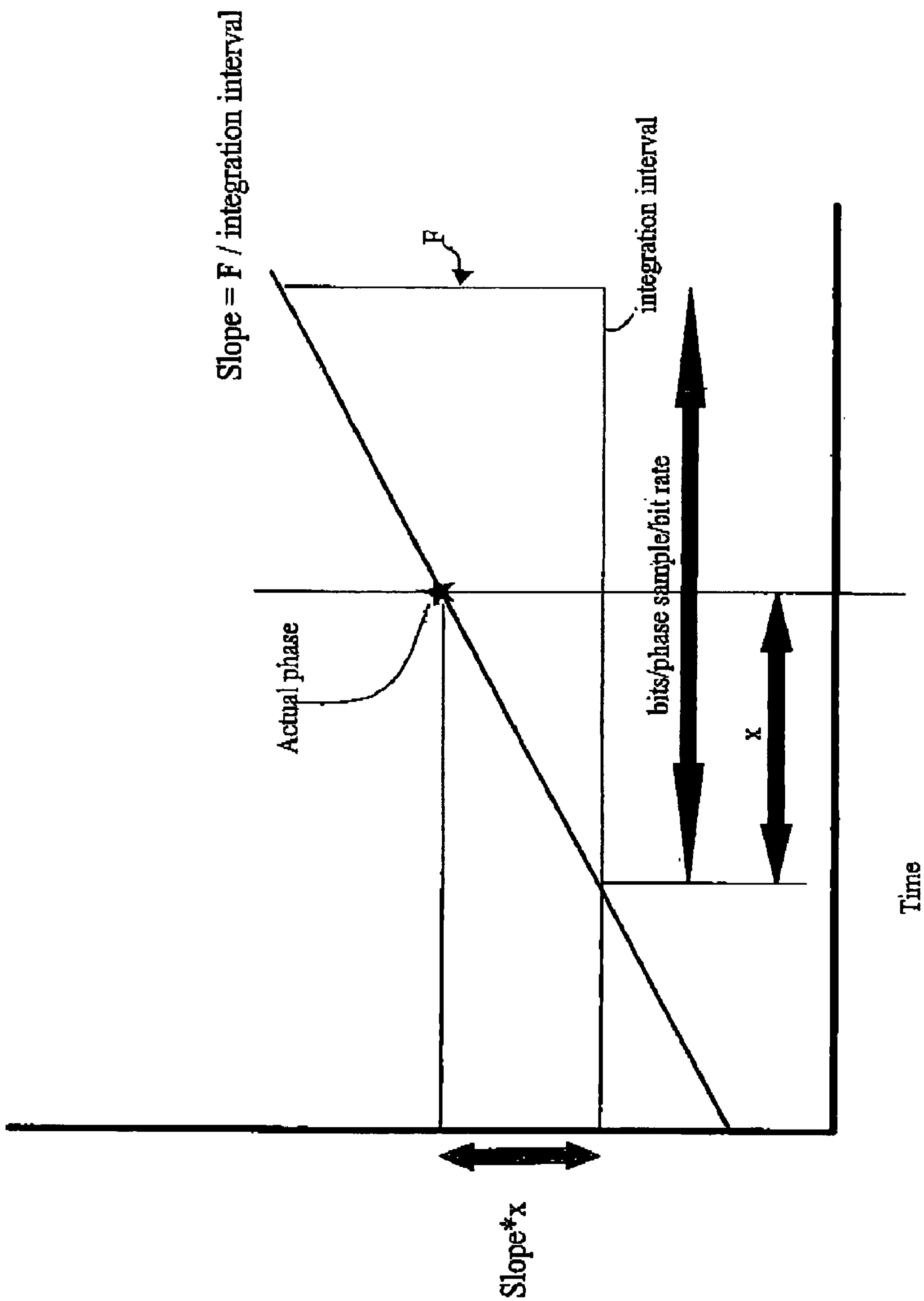
FIG. 4*c* depicts one phase estimate over one sampling interval in detail.

Referring to FIG. 4*c*, the phase step at the data multibit clock integration instant is the data multibit clock value F. The real time measurement is the time lapse X. The detected phase error measurement $\gamma$ can be determined by scaling the data multibit clock value F as follows:

X/integration interval=$\gamma$/F

Or alternatively, $\gamma$=F* [X/integration interval]

where F is the actual multibit clock value, with f being the local and imperfect estimate of F.

Once γ (the phase error for a sampling interval) is determined, this value is inputted to the phase detector/digital summer and added to the integrated phase values for the sampling interval to derive an actual data phase value, as follows:

Actual data phase=integrated phase values+F * [X/integration interval].

In this manner, waiting time jitter may be eliminated within the arbitrary resolution of the phase detection and the multibit clocks.

Figure 5:
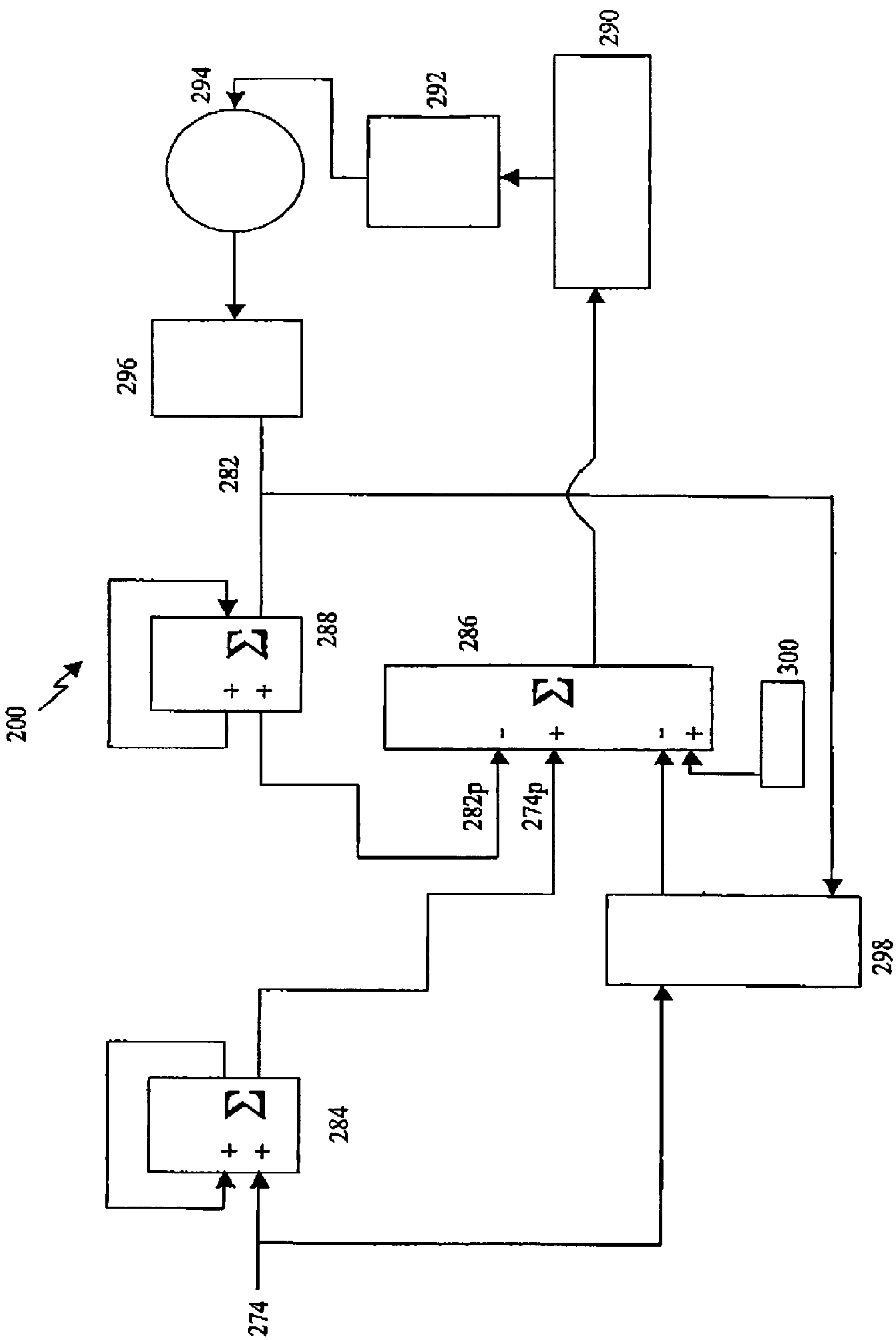
FIG. 5 depicts a desynchronizer PLL.

Referring to FIG. 5, the desynchronizer PLL 200 is depicted in greater detail. The F values at the block rate are received and converted into phase at a frequency/phase converter 284. The converter is a digital summer which sums the F values and periodically integrates the values to yield 32-bit phase information. The phase information is inputted into a phase comparator 286.

The SONET multibit clock 274 is formed by gapping the local SONET clock using the F values from each received block. This multibit clock is converted into phase at a frequency/phase converter 284. The converter is a digital summer which sums the multibit values and periodically integrates the values to yield 32-bit phase information. The phase information is also inputted into a phase comparator 286.

The phase comparator 286 is similar to the phase comparator at the synchronizer, being a digital subtractor. The phase comparator 286 compares the phase of the F values from the phase of the data multibit clock 282 and the SONET multibit clock 274 and outputs an error signal ϵ, representing the difference between the multibit clocks.

The output, or error signal, from the phase comparator 286 is averaged to a stabilized level. The output is inputted into a low pass filter (LPF) 290, followed by a digital to analog converter 292. In this manner, digital words are transformed into an analog voltage level.

The LPF 290 is a single order LPF and is selected so as to produce a PLL with a desired closed loop bandwidth in conjunction with the VCO gain constant selection. A digital to analog converter 292 converts the digital output from the phase comparator 286 to an analog signal and outputted to the analog VCO 294. The VCO 294 responds to input voltages by changing its output frequency. An "actual" PLL is formed with the phase comparator 286 as well as the LPF 290 and the VCO 294.

As a physical oscillator, the VCO 294 gives rise to phase noise. The amount of phase noise that is not tracked by the PLL and hence seen as jitter at the output of the PLL 290 is determined by the closed loop bandwidth of the PLL around the VCO 294. However, where the bandwidth is as wide as possible, phase noise can be tracked and will not result in jitter. Here, the PLL 294 is not used for smoothing out gaps in the write clock, as all phase transients have already been filtered before the loop and waiting time jitter has been eliminated to arbitrary accuracy. By incorporating a separate phase determination from the FIFO 272 fill, the VCO 294 can be locked in a wide bandwidth loop, so as to track substantially all out-of-phase noise and avoid delays resulting from large elastic stores traditionally required to absorb untracked wander.

Advantageously, a PLL bandwidth may be in the order of 1 MHz. This allows the use of a low cost, wide range oscillator. The wide bandwidth serves to suppress the larger phase noise from such an oscillator. The output from the VCO 294 is converted in an analog to digital converter 296 and then gapped for overhead. If overhead was not removed from the data signal at the synchronizer, then no gapping occurs.

In association with the reconstructed data clock, a data multibit clock 282 is formed from the analog VCO 294 for the recovered data clock. The multibit clock is inputted into a frequency to phase converter 288. This converter 288 is also a digital summer which continuously sums the multibit values received, which is periodically integrated to yield phase information. The phase information from the analog VCO 294 for the recovered data clock is inputted into the phase comparator 286 with the local SONET multibit clock to be subtracted from the phase information from the F values from the received blocks.

Imperfect phase sampling intervals due to the time differentials between the phase comparator and the phase estimator based on the reconstruction of the multibit clock values may result in jitter that can be eliminated to arbitrary accuracy by a detailed phase extrapolation. Similar to the synchronizer digital PLL, the desynchronizer PLL is provided with a detailed phase detector 298 similar to that provided on the synchronizer.

A constant reference value 300 is also inputted into the phase comparator 286 to be added to the F values, to keep phase centred in the buffer.

In this manner, almost any digital optical signal with a continuous clock of an arbitrary rate received may be mapped into a synchronous envelope, for example, a SONET STS-3nC envelope. In this architecture, waiting time jitter and wander are eliminated to arbitrary accuracy.

This architecture contributes to a transparent system that is scaleable to high data rates, for example, 40-gigabit rates. At the synchronizer, this architecture enables the expression of a data signal frequency with arbitrary accuracy, being referenced to both the system's local clock and the data signal's own clock, and enables the use of stuff words that scales linearly with the increased bit rate. The fill of the buffer does not drive the word stuff determination. Rather, the phase value is separately determined and separately smoothed, corrected and filtered in the synchronizer digital PLL. Similarly, at the desynchronizer, the architecture enables phase values that drive the output PLL to be separately determined from the buffer fill, the smoothing and filtering of noise and phase transients having already been completed prior to input into the VCO. As such, there is no phase corruption by write and read clock gaps, while buffer fill is maintained. At the desynchonizer, the PLL may be operated at wide bandwidths.

The present invention has been described with regard to preferred embodiments. However, it will be obvious to persons skilled in the art that numerous modifications, variations, and adaptations may be made to the particular embodiments of the invention described above without departing from the scope of the invention, which is defined in the claims.

What is claimed is:

1. A method of synchronizing a data signal for transport across a synchronous communications network, the method comprising steps of:

calculating a timing estimate (F) indicative of a relationship between a data rate ($f_1$) of the data signal and a reference frequency ($f_2$) of the synchronous communications network;

mapping data of the data signal to a synchronous signal of the synchronous communications network in accordance with the reference frequency ($f_2$), while inserting stuff bits into the synchronous signal in accordance with the timing estimate (F); and communicating the timing estimate (F) through the synchronous network.

2. A method as claimed in claim 1, wherein the timing estimate (F) comprises any one or more of:

a ratio between the data rate ($f_1$) and the reference frequency ($f_2$);

a difference between the data rate ($f_1$) and the reference frequency ($f_2$); and a phase difference between a recovered data clock signal associated with the data rate ($f_1$), and a reference clock signal associated with the reference frequency ($f_2$).

3. A method as claimed in claim 1, wherein the data rate ($f_1$) is represented by a data multi-bit clock signal comprising sequential multi-bit words generated at a frequency dependent on a bit rate of the data signal, a respective value of each multi-bit word being representative of a proportion of bits of the data signal to be transported across the synchronous communications network.

4. A method as claimed in claim 3, wherein the step of calculating the timing estimate (F) comprises steps of:

calculating a data phase value based on the data multi-bit clock;

calculating a synchronous phase value based on the reference frequency ($f_2$);

comparing the data phase value and the synchronous phase value at a predetermined sample rate, and generating an error value indicative of the comparison result; and calculating the timing estimate (F) as a time average of the error value.

5. A method as claimed in claim 4, wherein the step of calculating a data phase value comprises a step of adding a predetermined number of successive words of the data multi-bit clock.

6. A method as claimed in claim 4, wherein the step of calculating the synchronous phase value comprises steps of:

generating a second multi-bit clock signal comprising sequential multi-bit words generated at a frequency dependent on the reference frequency ($f_2$), a respective value of each multi-bit word being representative of a proportion of bits of the synchronous signal that are available for carrying bits of the data signal;

adding successive words of the second multi-bit clock; and integrating the addition result.

7. A method as claimed in claim 4, wherein the step of comparing the data phase value and the synchronous phase value comprises a step of subtracting the synchronous phase value from the data phase value.

8. A method as claimed in claim 7, wherein the step of comparing the data phase value and the synchronous phase value comprises a further step of subtracting a reference value R from the data phase value.

9. A method as claimed in claim 4, wherein the predetermined sample rate corresponds with a rate at which the data phase value is recalculated.

10. A method as claimed in claim 1, wherein the step of communicating the timing estimate (F) comprises a step of inserting the timing estimate into the synchronous signal, such that the timing estimate (F) is transported across the synchronous communications network.

11. A method as claimed in claim 1, wherein the step of mapping data of the data signal to the synchronous signal comprises steps of:

buffering the data in an elastic store in accordance with a data clock having the data rate ($f_1$);

reading the data from the elastic store in accordance with a read clock having the reference frequency ($f_2$);

inserting the read data into a synchronous payload envelope (SPE) of the synchronous signal; and inserting stuff bits into the SPE in accordance with the timing estimate (F).

12. A method as claimed in claim 2, wherein the stuff bits are substantially evenly distributed within the virtual tributary of the SPE.

13. A method of desynchronizing a data signal transported across a synchronous communications network, the method comprising steps of:

receiving a synchronous payload envelope (SPE) of the synchronous communications network, the SPE containing data of the data signal and a timing estimate (F) indicative of a relationship between a data rate ($f_1$) of the data signal and a reference frequency ($f_2$) of the synchronous communications network; and demapping the data of the data signal from the SPE in accordance with the reference frequency ($f_2$); while extracting stuff bits from the synchronous signal in accordance with the timing estimate (F).

14. A method as claimed in claim 13, wherein the timing estimate (F) comprises any one or more of:

a ratio between the data rate ($f_1$) and the reference frequency ($f_2$);

a difference between the data rate ($f_1$) and the reference frequency ($f_2$); and a phase difference between a recovered data clock signal associated with the data rate ($f_1$), and a reference clock signal associated with the reference frequency ($f_2$).

15. A method as claimed in claim 13, wherein the step of demapping data of the data signal from the SPE comprises steps of:

deriving an Rx local clock having a frequency corresponding to the reference frequency ($f_2$) of the synchronous communications network;

buffering the data in an elastic store in accordance with the Rx local clock and the timing estimate (F);

deriving a recovered data clock having a frequency substantially corresponding to the data rate ($f_1$), using the Rx local clock and the timing estimate (F);

reading the data from the elastic store in accordance with the recovered data clock.

16. A method as claimed in claim 15, wherein the step of buffering the data in the elastic store comprises steps of:

deriving a gapped write clock using the Rx local clock and the timing estimate (F);

using the gapped Rx local clock to write bits of the SPE to the elastic store, such that data bits of the data signal are written to the elastic store, and stuff bits are discarded.

17. A method as claimed in claim 15, wherein the step of deriving a recovered data clock comprises steps of:

supplying the Rx local clock to a desynchronizer Phase-Locked Loop (PLL); and steering the desynchronizer PLL using the multi-bit value indicative of the timing estimate (F).

18. A synchronizer for synchronizing a data signal for transport across a synchronous communications network, the synchronizer comprising:

a control loop unit for calculating a timing estimate (F) indicative of a relationship between a data rate ($f_1$) of the data signal and a reference frequency ($f_2$) of the synchronous communications network; and a mapping unit for mapping the data signal into a synchronous frame in accordance with the reference frequency ($f_2$), the mapping unit inserting staff bits into the synchronous frame in accordance with the timing estimate (F), the mapping unit also inserting the timing estimate (F) into the synchronous frame for transport across the synchronous communications network.

19. A synchronizer as claimed in claim 18 further comprising a buffer for elastically storing the data signal before being mapped by the mapping unit into the synchronous frame.

20. A synchronizer as claimed in claim 18 wherein the timing estimate (F) comprises any one or more of:

a ratio between the data rate ($f_1$) and the reference frequency ($f_2$);

a difference between the data rate ($f_1$) and the reference frequency ($f_2$); and a phase difference between a recovered data clock signal associated with the data rate ($f_1$), and a reference clock signal associated with the reference frequency ($f_2$).

21. A synchronizer as claimed in claim 18 wherein the control loop unit is a Digital Phase-Locked Loop (DPLL).

22. A synchronizer as claimed in claim 18 wherein the data signal, stuff bits and timing estimate (F) are mapped into a Synchronous Payload Envelope (SPE) of a SONET frame.

23. A synchronizer as claimed in claim 18 wherein the data rate ($f_1$) is represented by a data multi-bit clock signal comprising sequential multi-bit words generated at a frequency dependent on a bit rate of the data signal, a respective value of each multi-bit word being representative of a proportion of bits of the data signal to be transported across the synchronous communications network.

24. A desynchronizer for desynchronizing a data signal transported across a synchronous communications network within a synchronous payload envelope (SPE) of the synchronous communications network, the SPE containing data of the data signal and a timing estimate (F) indicative of a relationship between a data rate ($f_1$) of the data signal and a reference frequency ($f_2$) of the synchronous communications network, the desynchronizer comprising:

a pointer processor for demapping the data of the data signal from the SPE in accordance with the reference frequency ($f_2$); while extracting stuff bits from the synchronous signal in accordance with the timing estimate (F).

25. A desynchronizer as claimed in claim 24 further comprising:

an Rx clock recovery circuit for deriving an Rx local clock having a frequency corresponding to the reference frequency ($f_2$) of the synchronous communications network;

a buffer for elastically storing the data demapped from the SPE in accordance with the Rx local clock;

a desynchronizer Phase-Locked for deriving a recovered data clock having a frequency substantially corresponding to the data rate ($f_1$), using the Rx local clock and the timing estimate (F);

a gapper and framer unit for reading the data out of the buffer in accordance with the recovered data clock.

26. A desynchronizer as claimed in claim 24 wherein the timing estimate (F) comprises any one or more of:

a ratio between the data rate ($f_1$) and the reference frequency ($f_2$);

a difference between the data rate ($f_1$) and the reference frequency ($f_2$); and a phase difference between a recovered data clock signal associated with the data rate ($f_1$), and a reference clock signal associated with the reference frequency ($f_2$).

27. A desynchronizer as claimed in claim 24 wherein the data rate ($f_1$) is represented by a data multi-bit clock signal comprising sequential multi-bit words generated at a frequency dependent on a bit rate of the data signal, a respective value of each multi-bit word being representative of a proportion of bits of the data signal to be transported across the synchronous communications network.

* * * * *

UNITED STATES PATENT AND TRADEMARK OFFICE

CERTIFICATE OF CORRECTION

PATENT NO. : 7,023,942 B1
APPLICATION NO. : 09/972686
DATED : April 4, 2006
INVENTOR(S) : Kim B. Roberts et al.

It is certified that error appears in the above-identified patent and that said Letters Patent is hereby corrected as shown below:

In claim 12, column 12, line 9, “as claimed in claim 2” should read --as claimed in claim 11--.

Signed and Sealed this

Twelfth Day of September, 2006

JON W. DUDAS
*Director of the United States Patent and Trademark Office*